March 13, 1956  S. R. GENOE  2,737,740
PARKING SPACE GUARD
Filed Nov. 21, 1952
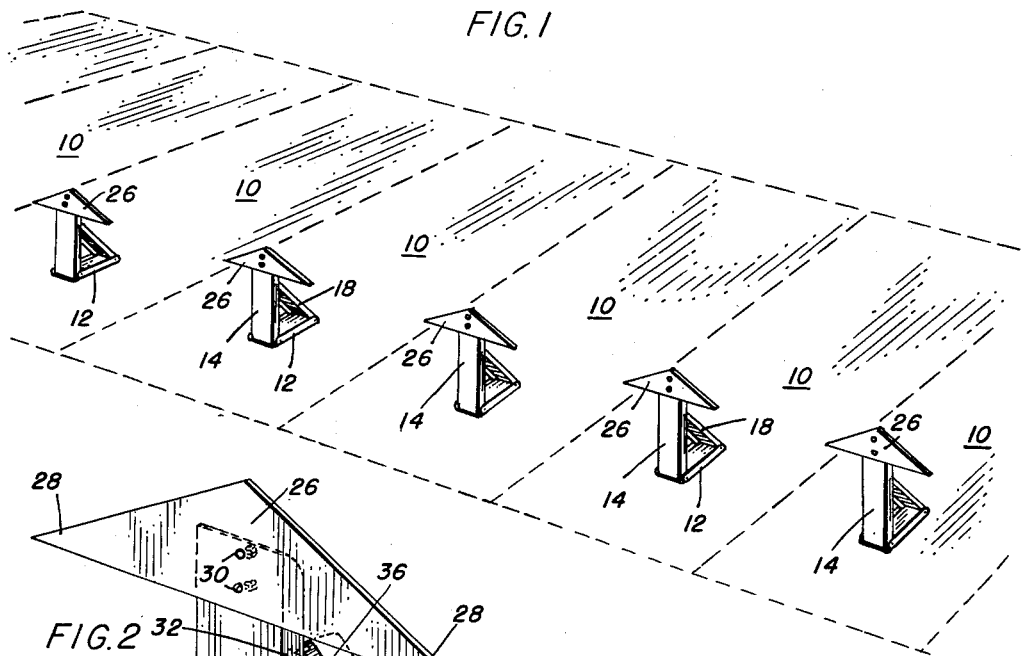
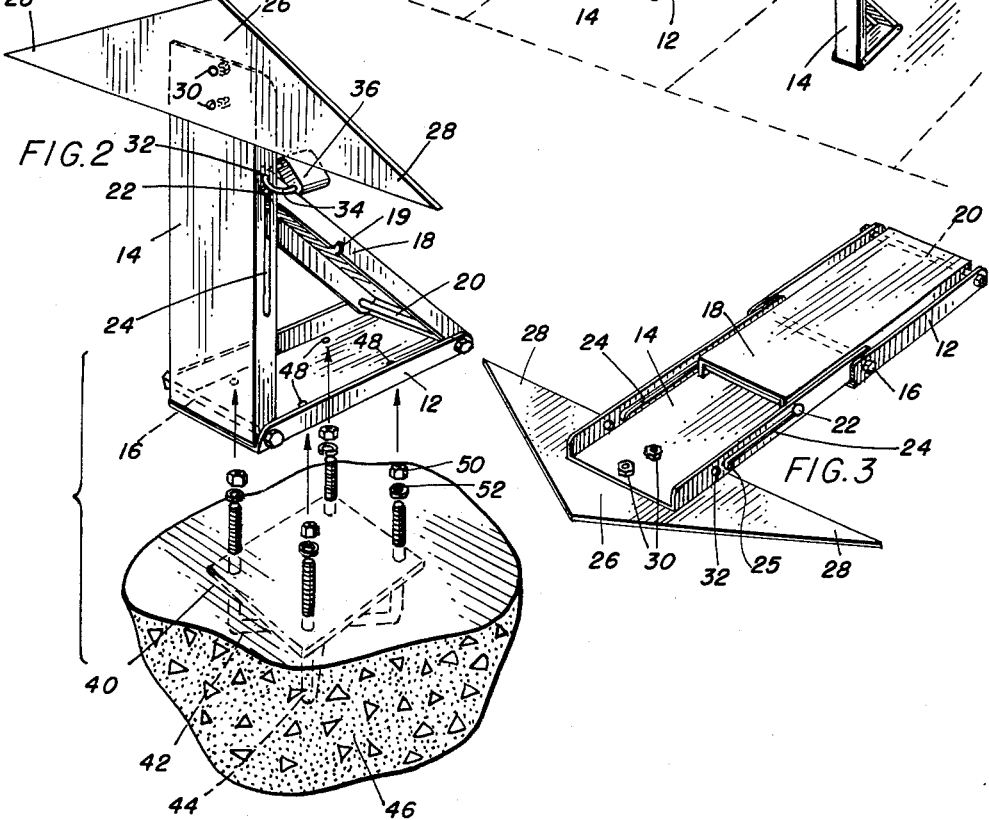
INVENTOR:
SEYMOUR R. GENOE
BY
ATT'Y

United States Patent Office 2,737,740
Patented Mar. 13, 1956

2,737,740

PARKING SPACE GUARD

Seymour R. Genoe, Chicago, Ill.

Application November 21, 1952, Serial No. 321,868

1 Claim. (Cl. 39—5)

This invention relates in general to a guard signal and a protector for an automobile parking space, and is mounted at the entry of the space to prevent unauthorized parking of an automobile or any other vehicle in that space.

Parking spaces are often provided for the automobiles of certain individuals such as officers of a company, doctors, instructors at a school, and it is desirable to reserve the space for their automobiles so that they will not be occupied by others to the exclusion of the persons for whom the spaces are intended.

The present invention provides means not only for affording a signal that the space is so reserved, but it also affords a guard for preventing anyone else from driving his car in the space and to protect adjacent spaces from being used in an unauthorized manner.

An important object of the invention is to provide a guard of this kind which is in upright position at the entry of the parking space and of a height to prevent an automobile from entering the space, but which may be easily folded in a compact relation so that any vehicle such as an automobile will pass readily over it.

A further object of the invention is to provide an improved simple guard of this kind which may be easily folded and extended and locked in upright position.

A further object of the invention is to provide a projecting guard which would prevent unauthorized vehicles from entering between the guards for adjacent parking spaces.

A further object of the invention is to provide a compactly foldable guard of this kind which may be easily packed for shipment and storage.

A still further object of the invention is to provide a simple mounting for firmly engaging the guard and holding it in position at the entry of a parking space.

Other objects of the invention will appear in the specification and will be apparent from the accompanying drawings in which:

Fig. 1 is a perspective view illustrating guards in accordance with this invention and applied to a number of adjacent parking spaces.

Fig. 2 is a perspective view showing a single parking guard in accordance with this invention in raised position together with means for mounting the guard in the ground or any other supporting surface; and Fig. 3 is a perspective view showing the guard in its compactly folded or lay-down position.

This invention is particularly useful in reserving certain parking space for the use of certain designated persons and preventing the unauthorized use of that space by anyone else. The guards for adjacent parking spaces are arranged so closely together and the signal portions extend laterally to such an extent that not enough space is afforded for driving an ordinary automobile between the protectors of adjacent spaces. If such an attempt is made, the ends of the protectors would engage the front portions of an automobile and would tend to mark or deface it so that an ordinary driver would not attempt to park between two guards.

Referring now more particularly to the drawings, a plurality of parking spaces 10 are shown in Fig. 1 having a parking guard of this invention applied at the entry of each parking space and normally standing in upright position when the parking space is not in use at a sufficient height to engage the front bumper of an automobile and to provide a signal that the space is reserved for someone else and to protect the space against unauthorized use.

Each guard comprises a base 12 preferably in the form of a shallow channel, an upright piece 14 also in the form of a shallow channel hinged to the base 12 at one end thereof by a bolt 16 extending through the flanges of the channels. At the other end of the base is a support 18 also in the form of a shallow channel with a fastening bolt 20 extending through the opposite flanges and upon which the support is hinged to the base. The upper end of the support 18 has a cross pin 22 between the flanges thereof and projecting beyond the flanges in engagement with slots 24 one at each side of the upright 14 and in the flanges thereof so that the support 18 will slide relatively to the upright and the upright may be extended from a nested position with respect to the other parts as shown in Fig. 3 to an upright position in which the support 18 forms an angular base for engaging the upright and holding it in its raised position. The three main pieces collapse readily together because the base channel is wider than the upright channel 14 and the support 18 is narrower than the upright channel and fits within it and is spaced from the flanges of the base 12 so that in folded position the upright 14 is projected by the support 18 substantially in line with it. In the edges of the side flanges of the support 18 are notches 19 which fit over the bolt 16 permitting the support 18 and the upright to fold compactly in the base 12.

At the top of the upright 14 is a signal plate 26 preferably in the form of a triangle with laterally projecting tips 28 which extends substantially beyond the sides of the upright 14 to partially fill the space between it and the sides of the parking space 10 to which it is applied and of such a length that the space between it and the adjacent signal plate is not sufficient to admit an ordinary automobile between them. This plate 26 may be secured to the upper end of the upright 14 by fastening bolts 30 or any other suitable fastening means. It may be disconnected for packing it compactly with the other parts.

In order to lock the guard in an upright position, one flange of the upright 14 may be provided with a perforation 32 and the adjacent end of the corresponding flange of the support 18 is provided with a registering perforation through which the hasp 34 of a padlock 36 may be inserted. To hold the upright 14 in raised position without locking it, the upper ends of the slots 24 may each be formed with a reverse bend or an extension 25 adapted to engage and seat the ends of the bolt 22 therein and easily disengaged therefrom by relative movement of the parts.

To mount the guard at the entrance to a parking space, any suitable fastening means may be supplied for engaging the base 12. This may comprise a spacing plate 40 with two U-bolts 42 and 44 imbedded in a block 46 of concrete and the threaded ends of the U-bolts extending through the plate 40 and of a length to extend above the concrete and through suitably spaced openings 48 in the base 12, so that fastening nuts 50 and washers 52 may be applied to the threaded ends of the U-bolts for fastening the base in place.

With this construction, the authorized user of the parking guard will raise the upright 14 bearing the signal plate 26 to its vertical position and will apply the lock 36 when he leaves the parking space. This will prevent unauthorized use of the parking space. When the rightful owner next appears, he need only open and remove the lock and turn the upright 14 downwardly to its collapsed position close to the ground whereupon his vehicle will move freely over the guard and will in fact protect the guard during the time his car is parked. The extremities 28 of the guard do not extend into the ordinary path of the wheels of the vehicle. In leaving the space, the guard is again raised and locked as before.

While this construction has been described in some detail, it should be regarded as an illustration or example rather than as a limitation or restriction of the invention, since various changes in the construction, combination and arrangement of the parts may be made without departing from the spirit and scope of the invention.

I claim:

A parking space guard for each vehicle space comprising a base in the form of a channel, an upright pivoted at one end of the base, a support pivoted at the other end of the base, the upright and the support engaging each other with the support at an angle to the base, and the upright in raised position and having a hinged and slidable connection to collapse them together in folding relation upon the base, the upright and the support being also of channel construction and fitting one within the other and within the base so that these parts fold flatly together in parallel relation when they are collapsed and the flanges of the upright member having slots therein and the support having a cross pin engaging in the slots for moving the upright member from a raised position at right angles to the base to a flatly collapsed position within the base and for moving the support from an angular intermediate position to a position enclosed between the other two members.

References Cited in the file of this patent

UNITED STATES PATENTS

| | | |
|---|---|---|
| 1,532,865 | Beck | Apr. 7, 1925 |
| 1,600,887 | Kimbrough | Sept. 21, 1926 |
| 2,255,911 | Burnison | Sept. 16, 1941 |
| 2,581,788 | Dunn | Jan. 8, 1952 |
| 2,637,920 | Stratton | May 12, 1953 |